(12) United States Patent
Wu et al.

(10) Patent No.: US 9,883,475 B2
(45) Date of Patent: Jan. 30, 2018

(54) LTE NETWORK SELECTION METHOD, DEVICE, AND SYSTEM

(71) Applicant: Huawei Technologies Co., Ltd., Shenzhen, Guangdong (CN)

(72) Inventors: Xiaobo Wu, Shanghai (CN); Yangming Lv, Shanghai (CN); Guobao Xi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/196,456

(22) Filed: Jun. 29, 2016

(65) Prior Publication Data

US 2016/0309439 A1    Oct. 20, 2016

Related U.S. Application Data

(63) Continuation of application No. PCT/CN2013/091084, filed on Dec. 31, 2013.

(51) Int. Cl.
| | |
|---|---|
| *H04W 4/00* | (2009.01) |
| *H04W 60/00* | (2009.01) |
| *H04W 8/02* | (2009.01) |
| *H04W 36/00* | (2009.01) |
| *H04W 8/06* | (2009.01) |
| *H04W 48/18* | (2009.01) |

(52) U.S. Cl.
CPC ......... *H04W 60/005* (2013.01); *H04W 8/02* (2013.01); *H04W 8/06* (2013.01); *H04W 36/0022* (2013.01); *H04W 48/18* (2013.01)

(58) Field of Classification Search
CPC ........ H04W 60/005; H04W 8/02; H04W 8/06
USPC .............. 455/435.1, 432.1, 436, 442, 422.1; 370/331
See application file for complete search history.

(56) References Cited

U.S. PATENT DOCUMENTS

| | | | |
|---|---|---|---|
| 2013/0231112 A1 | 9/2013 | Zhang | |
| 2013/0265954 A1* | 10/2013 | Dahlen | H04W 48/18 370/329 |
| 2014/0051443 A1* | 2/2014 | Diachina | H04W 36/0022 455/436 |

FOREIGN PATENT DOCUMENTS

| | | |
|---|---|---|
| CN | 102273296 A | 12/2011 |
| CN | 102497629 A | 6/2012 |
| CN | 102984703 A | 3/2013 |
| EP | 2291014 A1 | 3/2011 |
| EP | 2571313 A1 | 3/2013 |
| WO | 2011020002 A1 | 2/2011 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 12)", 3GPP TS 24.301 V12.3.0, Dec. 2013, 354 pages.

(Continued)

*Primary Examiner* — Nghi H Ly

(57) ABSTRACT

The present invention discloses an LTE network selection method. In a process of implementing CSFB combined registration, an MME of a Long Term Evolution LTE network sends a location area identity LAI to UE, where the LAI includes a PLMN identity of the LTE network, so that after a circuit switched fallback-based voice session ends, the UE preferably returns to the LTE network according to the PLMN identity.

18 Claims, 7 Drawing Sheets

(56) References Cited

OTHER PUBLICATIONS

"3rd Generation Partnership Project; Technical Specification Group Services and System Aspects; Circuit Switched (CS) fallback in Evolved Packet System (EPS); Stage 2 (Release 12)", 3GPP TS 23.272 V12.1.0, Dec. 2013, 100 pages.

* cited by examiner

LTE NETWORK SELECTION METHOD, DEVICE, AND SYSTEM

CROSS-REFERENCE TO RELATED APPLICATIONS

This application is a continuation of International Application No. PCT/CN2013/091084, filed on Dec. 31, 2013, which is hereby incorporated by reference in its entirety.

TECHNICAL FIELD

The present invention relates to the field of communications technologies, and specifically, to an LTE network selection method, a device, and a system.

BACKGROUND

Full coverage of a second generation (2G) or third generation (3G) network such as Global System for Mobile Communications (GSM) or Wideband Code Division Multiple Access (WCDMA) has been basically implemented.

With development of Long Term Evolution (Long Term Evolution, LTE) network technologies, LTE networks have covered some urban areas and traffic hotspot areas. In this way, in current communications networks, the LTE network coexists with the 2G or 3G network.

In a call process, user equipment (UE) may enter a 2G or 3G network from an LTE network. Because the LTE network has a different bearer mechanism from the 2G or 3G network, and the UE needs to be handed over from a packet switched (PS) domain to a circuit switched (CS) domain, interruption may occur in a voice call, which affects continuity of the voice call of a user.

Circuit switched fallback (CSFB) means fallback of UE covered by LTE to a network that has a CS domain when the UE processes a voice service. The US is triggered to be handed over from an LTE network to a CS domain of a 2G or 3G network, falls back, in a handover manner, to the network that has a CS domain, and processes the voice service in the network that has a CS domain.

However, in the prior art, after the UE falls back from the LTE network to the 2G or 3G network by means of handover, a registered public land mobile network PLMN of the UE changes from a first PLMN of the LTE network to a second PLMN of the 2G or 3G network.

When the UE returns to the LTE network from the 2G or 3G network, the UE may preferably camp on the second PLMN because the current registered PLMN of the UE is the second PLMN. As a result, the UE cannot return to the first PLMN in the LTE network, an LTE network operator of the first PLMN encounters a user turnover in a CSFB process, and operators cannot cooperate with each other.

SUMMARY

To resolve the foregoing problem in the prior art, embodiments of the present invention provide an LTE network selection method. In a process of implementing CSFB combined registration, an MME sends a location area identity LAI to UE, where the LAI includes a PLMN identity of an LTE network, so that after a circuit switched fallback-based voice session ends, the UE preferably returns to the LTE network according to the PLMN identity of the LTE network. The present invention further provides a corresponding device and system.

A first aspect of the present invention provides an LTE network selection method, including:

receiving, by a mobility management entity MME of a Long Term Evolution LTE network, a combined registration request message initiated by user equipment UE that is located in the LTE network; and sending, by the MME, a combined registration accept message to the UE, where the combined registration accept message carries a first location area identity LAI, public land mobile network PLMN information in the first LAI is a PLMN identity of the LTE network, and the PLMN identity of the LTE network is used to indicate an LTE network to which the UE chooses to return according to the PLMN identity after the UE falls back from the LTE network to a circuit switched CS domain of a second generation 2G or third generation 3G network.

With reference to the first aspect, in a first possible implementation manner, the combined registration request message is a combined attach request message or a combined tracking area update request message.

With reference to the first aspect or the first possible implementation manner of the first aspect, in a second possible implementation manner, the combined registration accept message is a combined attach accept message or a combined tracking area update accept message.

With reference to the first aspect or the first or second possible implementation manner of the first aspect, in a third possible implementation manner, after the receiving, by a mobility management entity MME, a combined registration request message initiated by user equipment UE that is located in the Long Term Evolution LTE network, and before the sending, by the MME, a combined registration accept message to the UE, the method further includes:

sending, by the MME, a location update request message to a mobile switching center MSC or a visitor location register VLR of the 2G or 3G network; and receiving, by the MME, a location update accept message sent by the MSC or the VLR, where the location update accept message carries a second LAI, and PLMN information in the second LAI is a PLMN identity of the 2G or 3G network.

With reference to the first aspect or any one of the first to third possible implementation manners of the first aspect, in a fourth possible implementation manner, the method further includes:

determining, by the MME, that the UE supports handover from the LTE network to the CS domain of the 2G or 3G network.

With reference to the first aspect or any one of the first to fourth possible implementation manners of the first aspect, in a fifth possible implementation manner, the method further includes:

receiving, by the MME, a request message initiated by the UE that is located in the LTE network, where the request message is used to request circuit switched fallback CSFB;

sending, by the MME, a notification message to an evolved NodeB eNodeB according to the request message, where the notification message is used to instruct the eNodeB to move the UE from the LTE network to the circuit switched CS domain of the second generation 2G or third generation 3G network for the CSFB;

receiving, by the MME, a handover required message sent by the eNodeB; and sending, by the MME, a first handover request message to the MSC or the VLR, where the first handover request message is used to request the MSC or the VLR to hand over the UE from the LTE network to the CS domain of the 2G or 3G network for the CSFB.

With reference to the first aspect or any one of the first to fifth possible implementation manners of the first aspect, in a sixth possible implementation manner, the combined registration request message further carries a tracking area identity TAI, and PLMN information in the TAI is the PLMN identity of the LTE network.

A second aspect of the present invention provides an LTE network selection method, including:

receiving, by a mobile switching center MSC or a visitor location register VLR of a second generation 2G or third generation 3G network, a location update request message sent by a mobility management entity MME of a Long Term Evolution LTE network; and sending, by the MSC or the VLR, a location update accept message to the MME, where the location update accept message carries a first location area identity LAI, public land mobile network PLMN information in the first LAI is a PLMN identity of the LTE network but not a PLMN identity of the 2G or 3G network, and the PLMN identity of the LTE network is used to indicate an LTE network to which the UE chooses to return according to the PLMN identity after the UE falls back from the LTE network to a circuit switched CS domain of a second generation 2G or third generation 3G network.

With reference to the second aspect, in a first possible implementation manner, the method further includes:

receiving, by the MSC or the VLR, a first handover request message sent by the MME, where the first handover request message is used to request the MSC to hand over the user equipment UE from the Long Term Evolution LTE network to the circuit switched CS domain of the second generation 2G or third generation 3G network for circuit switched fallback CSFB;

sending, by the MSC or the VLR, a third handover request message to a base station of the 2G or 3G network, where the third handover request message is used to request the base station to allocate a CS domain resource for handover of the UE to the CS domain of the 2G or 3G network; and receiving, by the MSC or the VLR, a third handover request response message sent by the base station, where the third handover request response message includes information about the CS domain wireless resource allocated by the base station for the handover of the UE to the CS domain of the 2G or 3G network.

With reference to the first possible implementation manner of the second aspect, in a second possible implementation manner, the method further includes:

sending, by the MSC or the VLR, a first handover response message to the MME, where the first handover response message includes the information about the CS domain wireless resource; and receiving, by the MSC or the VLR, a handover complete message sent by the UE, where the handover complete message indicates that the handover of the UE from the LTE network to the CS domain of the 2G or 3G network is completed.

A third aspect of the present invention provides an LTE network selection method, including:

sending, by user equipment UE that is located in a Long Term Evolution LTE network, a combined registration request message to a mobility management entity MME of the LTE network;

receiving, by the UE, a combined registration accept message sent by the MME, where the combined registration accept message carries a first location area identity LAI, and public land mobile network PLMN information in the first LAI is a PLMN identity of the LTE network; and after the UE falls back from the LTE network to a circuit switched CS domain of a second generation 2G or third generation 3G network, selecting, by the UE according to the PLMN identity of the LTE network in the LAI, an LTE network to which the UE is to return.

With reference to the third aspect, in a first possible implementation manner, the method further includes:

sending, by the UE, a request message to the MME, where the request message is used to request circuit switched fallback CSFB;

receiving, by the UE, a handover command sent by an evolved NodeB eNodeB, where the handover command is used to instruct to hand over the UE from the LTE network to the CS domain of the 2G or 3G network for the CSFB; and falling back, by the UE, from the LTE network to the CS domain of the 2G or 3G network according to the handover command.

With reference to the third aspect or the first possible implementation manner of the third aspect, in a second possible implementation manner, the combined registration request message is a combined attach request message or a combined tracking area update request message.

With reference to the third aspect or the first or second possible implementation manner of the third aspect, in a third possible implementation manner, the combined registration accept message is a combined attach accept message or a combined tracking area update accept message.

With reference to the third aspect or any one of the first to third possible implementation manners of the third aspect, in a fourth possible implementation manner, the method further includes:

receiving, by the UE, a redirect message sent by a base station of the 2G or 3G network, where the redirect message is used to instruct the UE to return to the LTE network.

With reference to the third aspect or any one of the first to fourth possible implementation manners of the third aspect, in a fifth possible implementation manner, the combined registration accept message further carries a tracking area identity TAI, where PLMN information in the TAI is the PLMN identity of the LTE network.

A fourth aspect of the present invention provides a mobility management entity MME of a Long Term Evolution LTE network, including:

a receiving unit, configured to receive a combined registration request message initiated by user equipment UE that is located in the LTE network;

a generation unit, configured to generate a combined registration accept message according to the combined registration request message received by the receiving unit, where the combined registration accept message carries a first location area identity LAI, public land mobile network PLMN information in the first LAI is a PLMN identity of the LTE network, and the PLMN identity of the LTE network is used to indicate an LTE network to which the UE chooses to return according to the PLMN identity after the UE falls back from the LTE network to a circuit switched CS domain of a second generation 2G or third generation 3G network; and a sending unit, configured to send, to the UE, the combined registration accept message generated by the generation unit.

With reference to the fourth aspect, in a first possible implementation manner, the sending unit is further configured to send a location update request message to a mobile switching center MSC or a visitor location register VLR of the 2G or 3G network after the receiving unit receives the combined registration request message and before the sending unit sends the combined registration accept message to the UE; and the receiving unit is further configured to receive a location update accept message sent by the MSC or the VLR, where the location update accept message carries a second LAI, and PLMN information in the second LAI is a PLMN identity of the 2G or 3G network.

With reference to the fourth aspect or the first possible implementation manner of the fourth aspect, in a second possible implementation manner, the mobility management entity further includes a determining unit; where the determining unit is configured to determine that the UE supports handover from the LTE network to the CS domain of the 2G or 3G network.

With reference to the fourth aspect or the first or second possible implementation manner of the fourth aspect, in a third possible implementation manner, the receiving unit is further configured to receive a request message initiated by the UE that is located in the LTE network, where the request message is used to request circuit switched fallback CSFB;

the generation unit is further configured to generate a notification message according to the request message received by the receiving unit, where the notification message is used to instruct an eNodeB to move the UE from the LTE network to the circuit switched CS domain of the 2G or 3G network for the CSFB;

the sending unit is further configured to send, to the evolved NodeB eNodeB, the notification message generated by the generation unit;

the receiving unit is further configured to receive a handover required message sent by the eNodeB;

the generation unit is further configured to generate a first handover request message according to the handover required message received by the receiving unit, where the first handover request message is used to request the MSC or the VLR to hand over the UE from the LTE network to the CS domain of the 2G or 3G network for the CSFB; and the sending unit is further configured to send, to the mobile switching center MSC or the VLR, the first handover request message generated by the generation unit.

A fifth aspect of the present invention provides a control device of a second generation 2G or third generation 3G network, where the control device is a mobile switching center MSC or a visitor location register VLR, and the control device includes:

a receiving unit, configured to receive a location update request message sent by a mobility management entity MME of a Long Term Evolution LTE network;

a generation unit, configured to generate a location update accept message according to the location update request message received by the receiving unit, where the location update accept message carries a first location area identity LAI, public land mobile network PLMN information in the first LAI is a PLMN identity of the LTE network but not a PLMN identity of the 2G or 3G network, and the PLMN identity of the LTE network is used to indicate an LTE network to which the UE chooses to return according to the PLMN identity after the UE fails back from the LTE network to a circuit switched CS domain of a second generation 2G or third generation 3G network; and a sending unit, configured to send, to the MME, the location update accept message generated by the generation unit.

With reference to the fifth aspect, in a first possible implementation manner, the receiving unit is further configured to receive a first handover request message sent by the MME, where the first handover request message is used to request the MSC to hand over the user equipment UE from the Long Term Evolution LTE network to the circuit switched CS domain of the second generation 2G or third generation 3G network for circuit switched fallback CSFB;

the generation unit is further configured to generate a third handover request message according to the first handover request message received by the receiving unit, where the third handover request message is used to request a base station to allocate a CS domain resource for handover of the UE to the CS domain of the 2G or 3G network;

the sending unit is further configured to send, to the base station of the 2G or 3G network, the third handover request message generated by the generation unit; and the receiving unit is further configured to receive a third handover request response message sent by the base station, where the third handover request response message includes information about the CS domain wireless resource allocated by the base station for the handover of the UE to the CS domain of the 2G or 3G network.

With reference to the first possible implementation manner of the fifth aspect, in a second possible implementation manner, the sending unit is further configured to send a first handover response message to the MME, where the first handover response message includes the information about the CS domain wireless resource; and the receiving unit is further configured to receive a handover complete message sent by the UE, where the handover complete message indicates that the handover of the UE from the LTE network to the CS domain of the 2G or 3G network is completed.

A sixth aspect of the present invention provides user equipment UE that is located in a Long Term Evolution LTE network, including:

a sending unit, configured to send a combined registration request message to a mobility management entity MME of the LTE network;

a receiving unit, configured to receive a combined registration accept message sent by the MME, where the combined registration accept message carries a first location area identity LAI, and public land mobile network PLMN information in the LAI is a PLMN identity of the LTE network; and a selection unit, configured to: after the UE falls back from the LTE network to a circuit switched CS domain of a second generation 2G or third generation 3G network, select, according to the PLMN identity of the LTE network in the LAI received by the receiving unit, an LTE network to which the UE is to return.

With reference to the sixth aspect, in a first possible implementation manner, the sending unit is further configured to send a request message to the MME, where the request message is used to request circuit switched fallback CSFB;

the receiving unit is further configured to receive a handover command sent by an evolved NodeB eNodeB, where the handover command is used to instruct to hand over the UE from the LTE network to the CS domain of the 2G or 3G network for the CSFB; and the user equipment further includes:

a handover unit, configured to fall back from the LTE network to the CS domain of the 2G or 3G network according to the handover command received by the receiving unit.

With reference to the sixth aspect or the first possible implementation manner of the sixth aspect, in a second possible implementation manner, the receiving unit is further configured to receive a redirect message sent by a base station of the 2G or 3G network, where the redirect message is used to instruct the UE to return to the LTE network.

By using the embodiments provided in the present invention, in a process of implementing CSFB combined registration, the MME sends a location area identity LAI to UE, where the LAI includes a PLMN identity of the LTE network, so that after a circuit switched fallback-based voice session ends, the UE preferably returns to the LTE network according to the PLMN identity of the LTE network.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION

Embodiments of the present invention provide an LTE network selection method. In a process of implementing CSFB combined registration, an MME sends a location area identity LAI to UE, where the LAI includes a PLMN identity of an LTE network, so that after a circuit switched fallback-based voice session ends, the UE preferably returns to the LTE network according to the PLMN identity of the LTE network. The present invention further provides a corresponding device and system, which are separately described in detail in the following.

English terms and acronyms and abbreviations of some communications terms related in the embodiments of the present invention include: mobility management entity (MME), evolved NodeB (eNodeB), UE, mobile switching center (MSC), second generation or third generation mobile communications technologies (2nd Generation/3rd Generation, 2G or 3G), and base station (BS), Long Term Evolution (LTE), serving GPRS support node (SGSN), circuit switched fallback (CSFB), universal terrestrial radio access network (UTRAN), Global System for Mobile communications (GSM), enhanced data rates for GSM evolution (EDGE), Global System for Mobile communications/enhanced data rate for GSM evolution radio access network (GERAN), visitor location register (VLR), and home subscriber server (HSS), where a base station in the embodiments of the present invention includes abase station controller (BSC) and a radio network controller (RNC).

"First", "second", "third", "fourth", "fifth", and the like in the embodiments of the present invention are only used for distinguishing different indication information, messages, or other objects but not for representing a sequence relationship.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Figure 1:
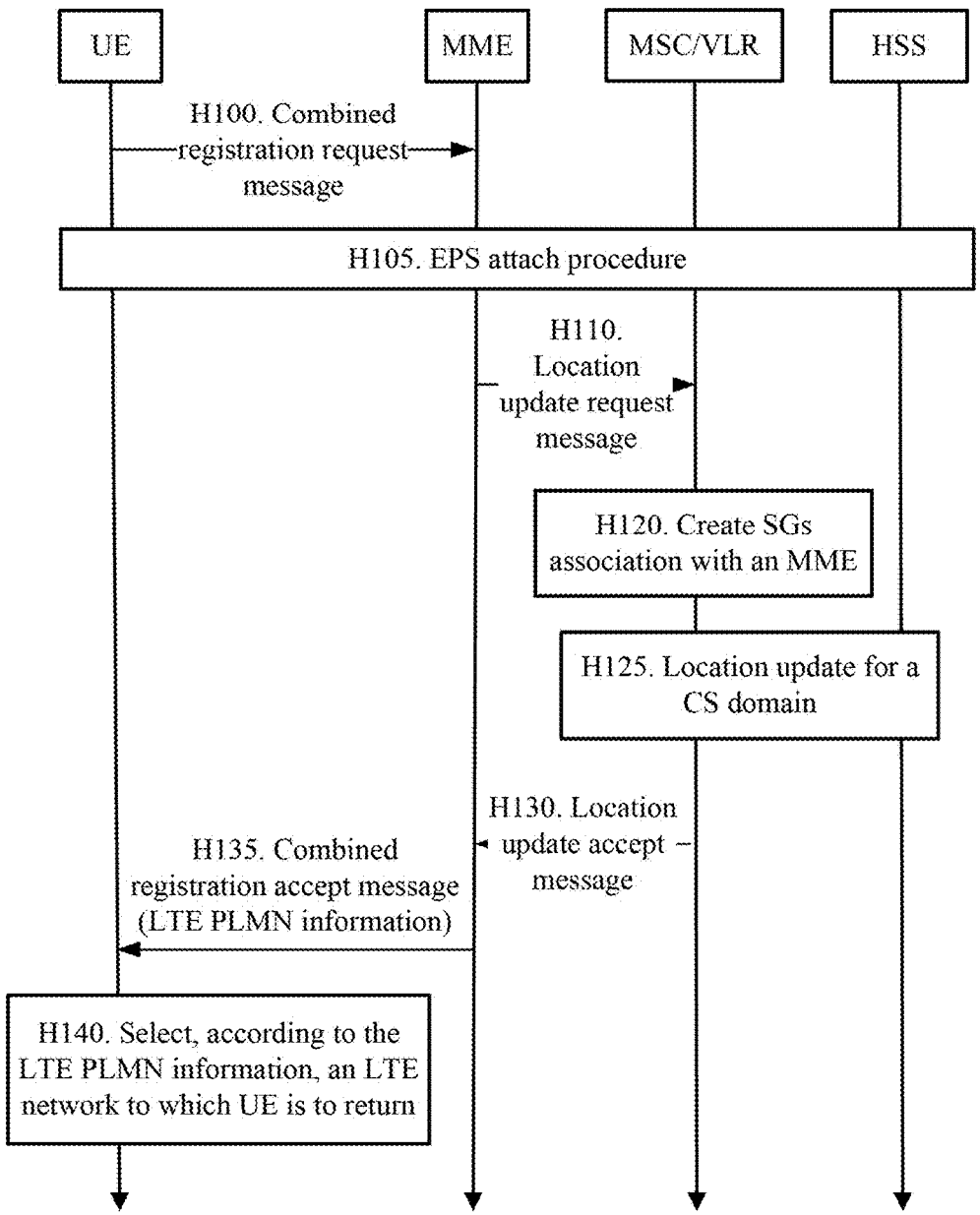
FIG. 1 is a schematic diagram of an embodiment of an LTE network selection method according to an embodiment of the present invention.

Referring to FIG. 1, FIG. 1 is a schematic diagram of an embodiment of an LTE network selecting method according to an embodiment of the present invention, and the method includes:

H100. UE initiates a network combined registration procedure, and sends a combined registration request message to an MME of a Long Term Evolution LTE network.

The combined registration request message may be a combined attach request message (Combined Attach) or a combined tracking area update request message (Combined TAU).

H105. The MME triggers an EPS attach procedure.

The specific EPS attach procedure is the prior art. Refer to TS23.401 attach standards for understanding.

H110. The MME sends a location update request (Location Update Request) message to an MSC/a VLR.

The location update request message carries a tracking area identity (TAI, Tracking Area Identification), where the tracking area identity includes public land mobile network (Public Land Mobile Network, PLMN) information. Generally, the PLMN information in the tracking area identity is LTE PLMN information.

Specifically, for the combined registration procedure, the MME needs to send the location update request message to the MSC/VLR.

However, for a combined attach process, if the MME does not have context of the UE or the MME needs to establish SGs interfaces with different MSCs, the MME needs to send the location update request message to the MSC or the VLR.

H120. The MSC or the VLR creates SGs association with the MME.

H125. The MSC or the VLR performs a location update process for a CS domain by using an HSS.

H130. The MSC or the VLR returns a location update accept message (Location Update Accept) to the MME.

The location update accept message carries a location area identity (LAI, Location Area Identification), where the location area identity includes PLMN information.

Generally, the PLMN information in the location area identity is 2G or 3G PLMN information. In the present invention, the MSC or the VLR replaces the 2G or 3G PLMN information in the location area identity with the LTE PLMN information, that is, the PLMN information in the location area identity LAI carried in the location update accept information returned to the MME by the MSC or the VLR is the LTE PLMN information.

H135. The MME sends a combined registration accept message to the UE.

The combined registration accept message carries a location area identity LAI, where the LAI includes LTE PLMN information.

Generally, PLMN information in the location area identity LAI is 2G or 3G PLMN information. In the present invention, the MME replaces the 2G or 3G PLMN information in the location area identity LAI with the LTE PLMN information, that is, the PLMN information in the location area identity LAI carried in the combined registration accept message or a combined attach accept message returned to the UE by the MME is the LTE PLMN information.

Optionally, the MME determines whether the UE supports handover from the LTE network to a CS domain of the 2G or 3G network. If the UE supports the handover from the LTE network to the CS domain of the 2G or 3G network, the MME replaces the 2G or 3G PLMN information in the LAI with the LTE PLMN information. If the UE does not support the handover from the LTE network to the CS domain of the 2G or 3G network, the MME does not replace the 2G or 3G PLMN information in the LAI with the LTE PLMN information.

Specifically, the combined registration accept message may be a combined attach accept message (Combined Attach Accept) or a combined tracking area update accept message (Combined TAU accept).

H140. The UE selects, according to the LTE PLMN information, an LTE network to which the UE is to return.

By using the embodiment provided in the present invention, after a circuit switched fallback-based voice session ends, the UE preferably returns to the LTE network according to a PLMN identity of the LTE network.

Figure 2:
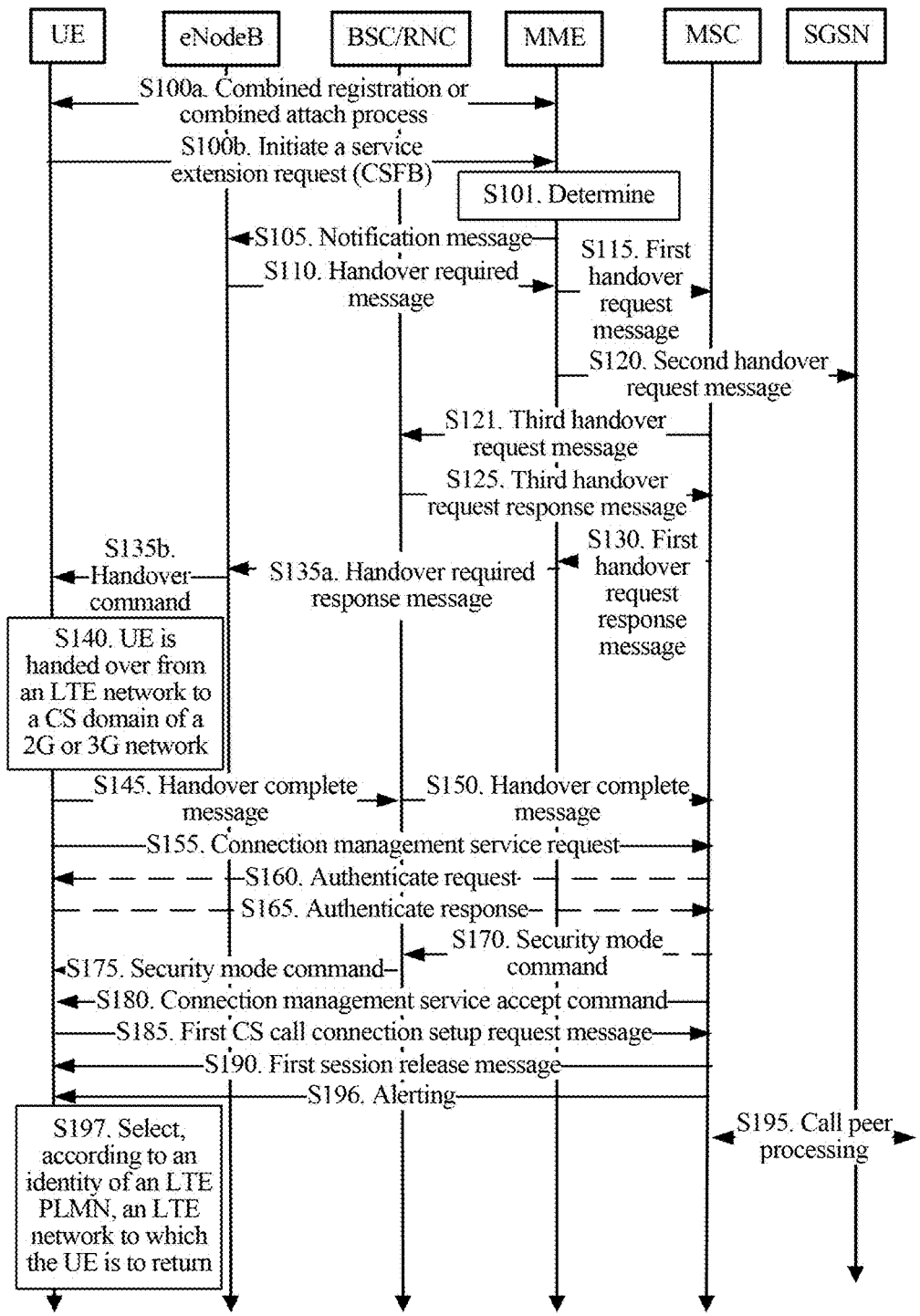
FIG. 2 is a schematic diagram of another embodiment of an LTE network selection method according to an embodiment of the present invention.

Referring to FIG. 2, FIG. 2 is a fallback process implemented by handing over UE from an LTE network to a 2G or 3G network, an active call process after handover, and a process of returning to the LTE network after the active call process according to an embodiment of the present invention.

S100a. As shown in FIG. 1, before initiating a CSFB process, UE needs to first perform combined registration. An MME of a Long Term Evolution LTE network sends a combined registration accept message to the UE, where the combined registration accept message carries a first LAI, and PLMN information in the first LAI is LTE PLMN information.

S100b. The UE sends a service extension request to the MME, where the service extension request is used to request circuit switched fallback CSFB.

S101. The MME may determine whether the LTE network and a 2G or 3G network support handover of the UE from the LTE network to a CS domain of the 2G or 3G network for the CSFB.

Alternatively, the MME may not perform determining, but deems by default that communications networks support the handover of UE from the LTE network to the CS domain of the 2G or 3G network for the CSFB, or performs determining only on some networks.

The communications networks are the LTE network and the 2G or 3G network.

S105. The MME sends a notification message to an evolved NodeB eNodeB according to the service extension request, where the notification message is used to instruct the eNodeB to move the UE from the LTE network to the CS domain of the 2G or 3G network for the CSFB. That is, the notification message is used to indicate to the eNodeB that the UE should be moved to the 2G or 3G network for the CSFB.

When the MME determines that the LTE network and the 2G or 3G network support the handover of the UE from the LTE network to the CS domain of the 2G or 3G network for the CSFB, the MME may send the notification message to notify the eNodeB that the LTE network and the 2G or 3G network support the handover of the UE from the LTE network to the CS domain of the 2G or 3G network for the CSFB, so that the eNodeB initiates a handover request of handing over the UE from the LTE network to the CS domain of the 2G or 3G network for the CSFB.

For example, the notification message may include indication information, and the indication information is used to indicate that the communications networks and the UE support the handover of the UE from the LTE network to the CS domain of the 2G or 3G network for the CSFB.

S110. The eNodeB sends a handover required message to the MME.

The handover required message may be a handover required message of handover from the LTE network to a packet switched PS domain of the 2G or 3G network (for example, an LTE to 2/3G PS HO Required message), or a handover required message of handover from the LTE network to the CS domain of the 2G or 3G network (for example, an LTE to 2/3G SRVCC HO Required message), or a handover required message of handover from the LTE network to a PS domain and the CS domain of the 2G or 3G network (for example, an LTE to 2/3G SRVCC and PS HO Required message).

S115. The MME sends a first handover request message to an MSC, where the first handover request message is used to request MSC to hand over the UE from the LTE network to the circuit switched CS domain of the second generation 2G or third generation 3G network for the CSFB.

Because the first handover request message is sent by the MME to the MSC, handover required in the first handover request message is the handover from the LTE network to the CS domain of the 2G or 3G network, that is, the first handover request message is a PS-to-CS handover request.

The first handover request message may carry third indication information, where the third indication information is used to request the MSC to hand over the UE from the LTE network to the CS domain of the 2G or 3G network for the CSFB. That is, the third indication information is used to indicate that the first handover request is sent for the CSFB. The third indication information may further indicate that the UE supports the handover from the LTE network to the CS domain of the 2G or 3G network. Alternatively, the first handover request message may not indicate the CSFB. In this case, the MSC deems by default that the first handover request message is sent for the CSFB.

S120. The MME sends a second handover request message to an SGSN, where the second handover request message is used to request the SGSN to initiate handover from the LTE network to a packet switched PS domain of the 2G or 3G network.

When being handed over from the LTE network to the CS domain, the UE may be handed over to the PS domain at the same time or may not be handed over to the PS domain at the same time. In this way, by using this solution, network dependency can be reduced, that is, it is only required that an operator support the handover from LTE to the CS domain of the 2G or 3G network, and it is unnecessary to enforce the operator to support the handover from the LTE to the PS domain of the 2G or 3G network.

S121. The MSC sends a third handover request message to a base station, where the third handover request message is used to request the base station to allocate a CS domain resource for the handover of the UE to the CS domain of the 2G or 3G network.

The third handover request message is further used to request the base station to hand over the user equipment UE from the Long Term Evolution LTE network to the circuit switched CS domain of the 2G or 3G network for the CSFB. The base station allocates the CS domain resource for the handover of the UE from the LTE network to the CS domain of the 2G or 3G network. For example, the CS domain resource allocated by the base station includes a wired resource between the base station and the MSC and a wireless resource between the base station and the UE.

S125. The base station sends a third handover request response message to the MSC, where the third handover request response message includes information about the CS domain wireless resource, and the information about the CS domain wireless resource is used for the handover of the UE from the LTE network to the CS domain of the 2G or 3G network.

S130. The MSC sends a first handover response message to the MME, where the first handover response message includes the information about the CS domain wireless resource.

S135a. The MME sends a handover required response message to the eNodeB, where the handover required response message includes the information about the CS domain wireless resource.

S135b. The eNodeB sends a handover command to the UE, where the handover command includes the information about the CS domain wireless resource.

S140. The UE is handed over from the LTE network to the CS domain of the 2G or 3G network according to the handover command.

(a) If the UE is handed over from the LTE network to the CS domain of the 3G network, a second LAI carried in UTRAN mobility information (UTRAN Mobility Information) that is sent by an RNC and received by the US is different from the first LAI obtained in the combined attach or combined registration process in step S100a.

Specifically, the PLMN information carried in the first LAI is the LTE PLMN information, but PLMN information carried in the second LAI is 3G PLMN information.

However, the UE is handed over from the LTE network to the CS domain of the 2G or 3G network, and therefore, even if the first location area identity LAI is inconsistent with the second location area identity LAI, the UE does not perform a location area update (LAU) process, and initiates a location area update process only after a voice session triggered because of a CSFB process ends.

(b) If the UE is handed over from the LTE network to the CS domain of the 2G network, even if the first LAI is inconsistent with the second LAI, the UE does not perform a location area update (LAU) process, and initiates a location area update process only after a voice session triggered because of a CSFB process ends.

The UE is handed over from the LTE network to the CS domain of the 2G or 3G network for the CSFB by using the information, included in the handover command, about the resource.

The UE generates a third session in the process of being handed over from the LTE network to the CS domain of the 2G or 3G network, or the UE may not generate a session in the process of being handed over from the LTE network to the CS domain of the 2G or 3G network.

S145. The UE sends a handover complete (HO Complete) message to the base station (BSC or RNC) after completion of the handover.

S150. The base station forwards the handover complete message in step S145 to the MSC.

S155. The UE sends a connection management service request (CM Service Request) to the MSC.

S160. The MSC sends an authenticate request (Authenticate Request) to the UE.

Alternatively, step S160 may not be performed, that is, the MSC does not send an authenticate request message to the UE.

S165. The UE sends an authenticate response (Authenticate Response) to the MSC.

S170. The MSC sends a security mode command (Security mode command) to the base station, where the security mode command carries integrity protection information (Integrity Protection Information) and/or encryption information (Encryption Information), so that the base station sends the security mode command to the UE.

Alternatively, step S170 may not be performed, that is, the MSC does not send the security mode command to the base station.

S175. The base station sends the security mode command to the UE. Specifically, the base station performs this step according to the security mode command in step S170, or the base station performs this step after receiving the message in S145.

S180. Optionally, the MSC sends a connection management service accept command (CM service Accept) to the UE.

S185. The UE sends a first CS call connection setup request message (Setup) to the MSC, where the first CS call connection setup request message is used to request the MSC to generate a first session for the CSFB, or the first CS call connection setup request message is used to request the MSC to generate a third session for the CSFB.

S190. After the MSC receives the first CS call connection setup request message, if the first CS call connection setup request message is used to request the MSC to generate the first session for the CSFB, the MSC sends a first session release message to the UE, where the first session release message is used to request the UE to release the third session generated by the UE in the process of the handover from the LTE network to the CS domain of the 2G or 3G network.

If the first CS call connection setup request message is used to request the MSC to generate the third session for the CSFB, the MSC does not need to send a first session release message to the UE.

S195. The MSC performs call peer processing.

S196. The MSC sends an alerting (Alerting) message to the UE, and the UE waits for an answer message from a peer.

Further, a called party picks up a phone and enters a call state.

After the call ends, because the call is triggered by the CSFB, the UE needs to return to the LTE network after completing the call. The base station determines, according to the third handover request message, that the call is triggered by the CSFB, and after a base station of the 2G/3G network receives a call release message sent by the MSC, the base station of the 2G/3G network redirects the UE to the LTE network.

In this case, a current LAI of the UE is the first location area identity LAI, and PLMN information in the LAI is LTE PLMN information. The UE deems that a current registered PLMN (RPLMN) is an LTE PLMN, and therefore, when the UE receives an RNC redirect message (RRC Release with Redirection or RRC Release), the UE preferably camps on the LTE PLMN.

Alternatively, the base station hands over the UE to the LTE network, and the call release message is a release command Iu Release Command or a clear command Clear Command.

S197. The UE selects, according to an identity of the LTE PLMN, an LTE network to which the UE is to return.

It should be noted that, in this embodiment, the base station may parse CS signaling between the UE and the MSC. The base station receives a signaling message sent by the UE to the MSC, for example, the connection management service request, the authenticate response, the first CS call connection setup request message, and other signaling messages. The base station may send the signaling message to the MSC by using a connection that is set up in the process of the handover from the LTE network to the CS domain of the 2G or 3G network, or send the signaling message to the MSC by using a direct transmission message.

In this embodiment, the indication information, first indication information, second indication information, the third indication information, fourth indication information, and fifth indication information included in the notification message may include a CSFB indication field, or a CSFB indication field and a UE capability field. The CSFB indication field instructs the MME, the MSC, or the base station of the 2/3G network to hand over the UE from the LTE network to the circuit switched CS domain of the 2G or 3G network for the CSFB. The UE capability field indicates that the UE supports the handover from the LTE network to the PS domain of the 2G or 3G network.

In FIG. 2, after a circuit switched fallback-based voice session ends, the UE preferably returns to the LTE network according to a PLMN identity of the LTE network.

Figure 3:
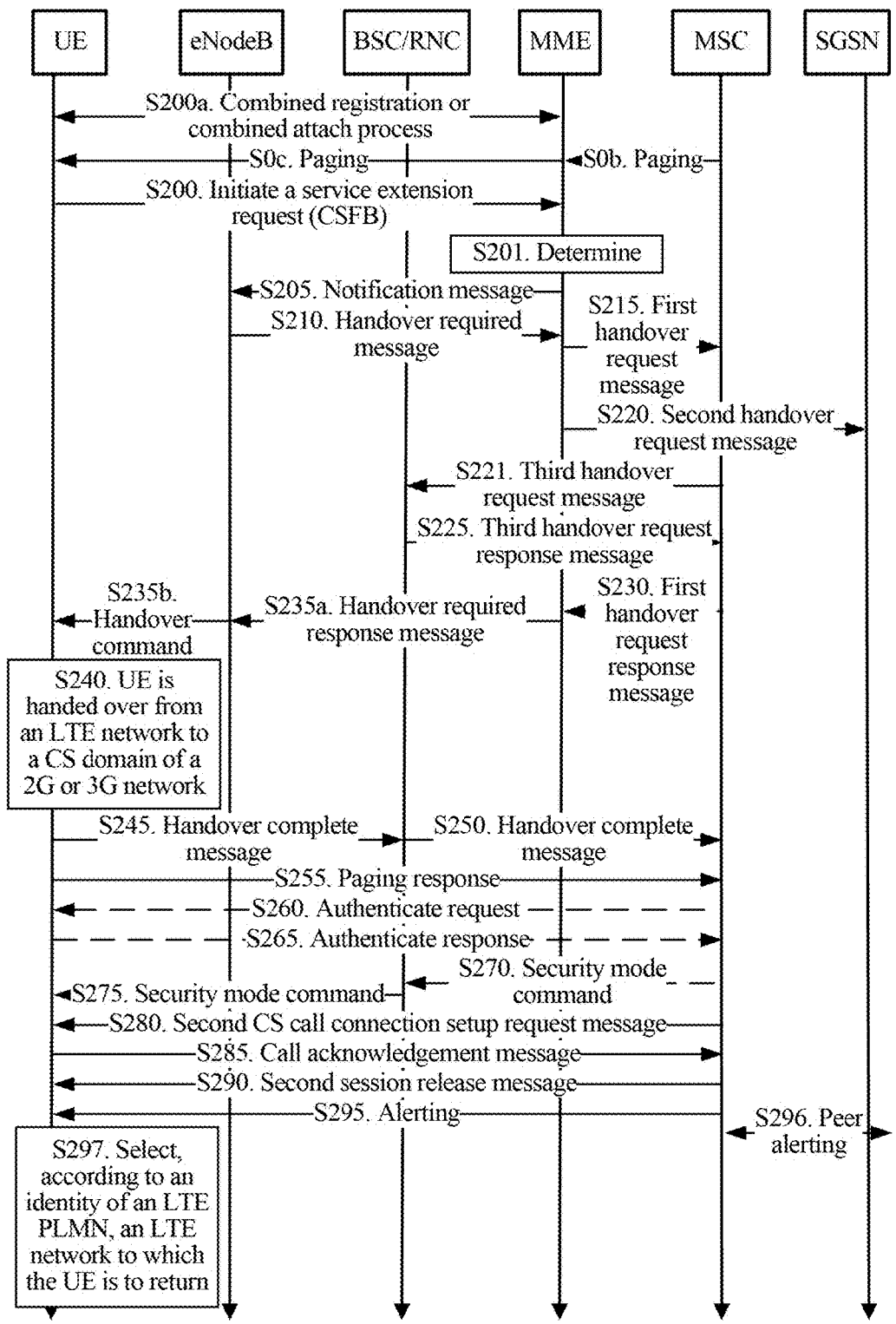
FIG. 3 is a schematic diagram of another embodiment of an LTE network selection method according to an embodiment of the present invention.

Referring to FIG. 3, FIG. 3 is a network handover process, a passive call process after network handover, and a process of returning to an LTE network after the passive call process according to an embodiment of the present invention.

S0b-S0c: An MSC sends a CS paging request to an MME, and MME of a Long Term Evolution LTE network triggers a paging process.

Steps S200a to S250 are the same as steps S100 to S150 in FIG. 2, and details are not described herein again.

S255. The UE sends a paging response to the MSC.

S260. The MSC sends an authenticate request to the UE.

Alternatively, step S260 may not be performed, that is, the MSC does not send an authenticate request message to the UE.

S265. The UE sends an authenticate response to the MSC.

S270. The MSC sends a security mode command to the base station, where the security mode command carries integrity protection information (Integrity Protection Information) and/or encryption information (Encryption Information), so that the base station sends the security mode command to the UE.

Alternatively, step S270 may not be performed, that is, the MSC does not send the security mode command to the base station.

S275. The base station sends the security mode command to the UE. Specifically, the base station performs this step according to the security mode command in step S270, or the base station performs this step after receiving the message in S245.

S280. The MSC sends a second CS call connection setup request message to the UE, where the second CS call connection setup request message is used to request the UE to generate a second session for the CSFB, or the second CS call connection setup request message is used to request the UE to generate a third session for the CSFB.

After the UE receives a second CS call connection setup request message sent by the mobile switching center MSC, the following is further included:

receiving or sending, by the UE, session data of the second session by using the resource.

S285. The MSC receives a call acknowledgement message sent by the UE.

S290. If the second CS call connection setup request message is used to request the UE to generate the second session for the CSFB, the MSC sends a second session release message to the UE, where the second session release message is used to request the UE to release the third session generated by the UE in the process of the handover from the LTE network to the CS domain of the 2G or 3G network.

If the second CS call connection setup request message is used to request the UE to generate the third session for the CSFB, the MSC does not need to send a second session release message to the UE.

The UE receives the session release message sent by the MSC.

S295. The MSC sends an alerting (Alerting) message to the UE, and the UE enters a call state.

S296. The MSC triggers altering of a peer.

After the call ends, because the call is triggered by the CSFB, the UE needs to return to the LTE network after completing the call. The base station determines, according to the third handover request message, that the call is triggered by the CSFB. Therefore, after a base station of the 2G or 3G network receives a call release message sent by the MSC, the base station of the 2/3G network redirects the UE to the LTE network or the base station hands over the UE to the LTE network, where the call release message is a release command Iu Release Command or a clear command Clear Command.

In this case, a current LAI of the UE is the first location area identity LAI, and PLMN information in the LAI is LTE PLMN information. The UE deems that a current registered PLMN (RPLMN) is an LTE PLMN, and therefore, when the UE receives an RNC redirect message (RRC Release with Redirection or RRC Release), the UE preferably camps on the LTE PLMN.

S297. The UE selects, according to an identity of the LTE PLMN, an LTE network to which the UE is to return.

It should be noted that, in this embodiment, the base station may parse CS signaling between the UE and the MSC. The base station receives a signaling message sent by the UE to the MSC, for example, the call acknowledgement message, the authenticate response, the second CS call connection setup request message, and other signaling messages. The base station may send the signaling message to the MSC by using a connection that is set up in the process of the handover from the LTE network to the CS domain of the 2G or 3G network, or send the signaling message to the MSC by using a direct transmission message.

In this embodiment, the indication information, second indication information, the third indication information, fourth indication information, and fifth indication information included in the notification message may include a CSFB indication field, or a CSFB indication field and a UE capability field. The CSFB indication field instructs the MME to hand over the UE from the LTE network to the circuit switched CS domain of the 2G or 3G network for the CSFB. The UE capability field indicates that the UE supports the handover from the LTE network to the PS domain of the 2G or 3G network.

By using the embodiment provided in the present invention, after a circuit switched fallback-based voice session ends, the UE preferably returns to the LTE network according to a PLMN identity of the LTE network.

In the foregoing three application scenarios, an entire process of selecting an LTE network and performing a session is described from three perspectives: attach, UE as a calling party, and UE as a called party.

Figure 4:
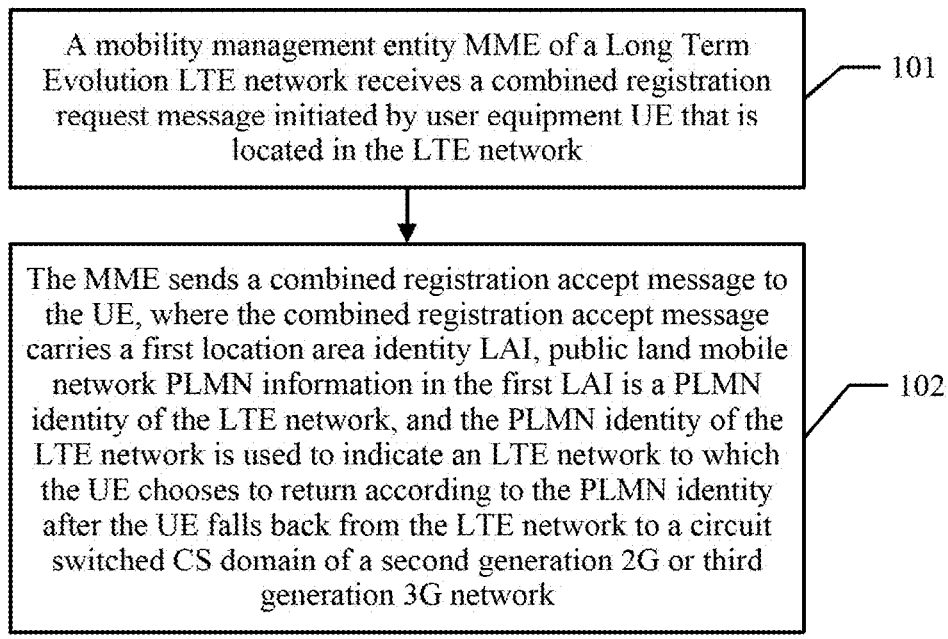
FIG. 4 is a schematic diagram of another embodiment of an LTE network selection method according to an embodiment of the present invention.

Referring to FIG. 4, another embodiment of an LTE network selection method provided in an embodiment of the present invention includes the following steps:

101. A mobility management entity MME of a Long Term Evolution LTE network receives a combined registration request message initiated by user equipment UE that is located in the LTE network.

The combined registration request message is a combined attach request message or a combined tracking area update request message.

102. The MME sends a combined registration accept message to the UE, where the combined registration accept message carries a first LAI, public land mobile network PLMN information in the first LAI is a PLMN identity of the LTE network, and the PLMN identity of the LTE network is used to indicate an LTE network to which the UE chooses to return according to the PLMN identity after the UE falls back from the LTE network to a circuit switched CS domain of a second generation 2G or third generation 3G network.

The combined registration accept message is a combined attach accept message or a combined tracking area update accept message.

The combined registration accept message further carries a tracking area identity TAI, where PLMN information in the TAI is PLMN identity of the LTE network.

For detailed descriptions of the foregoing processing steps and other processing steps of the MME of the Long Term Evolution LTE network in this embodiment, reference may be made to the descriptions in the embodiments corresponding to FIG. 1 to FIG. 3, and details are not described herein again.

Figure 5:
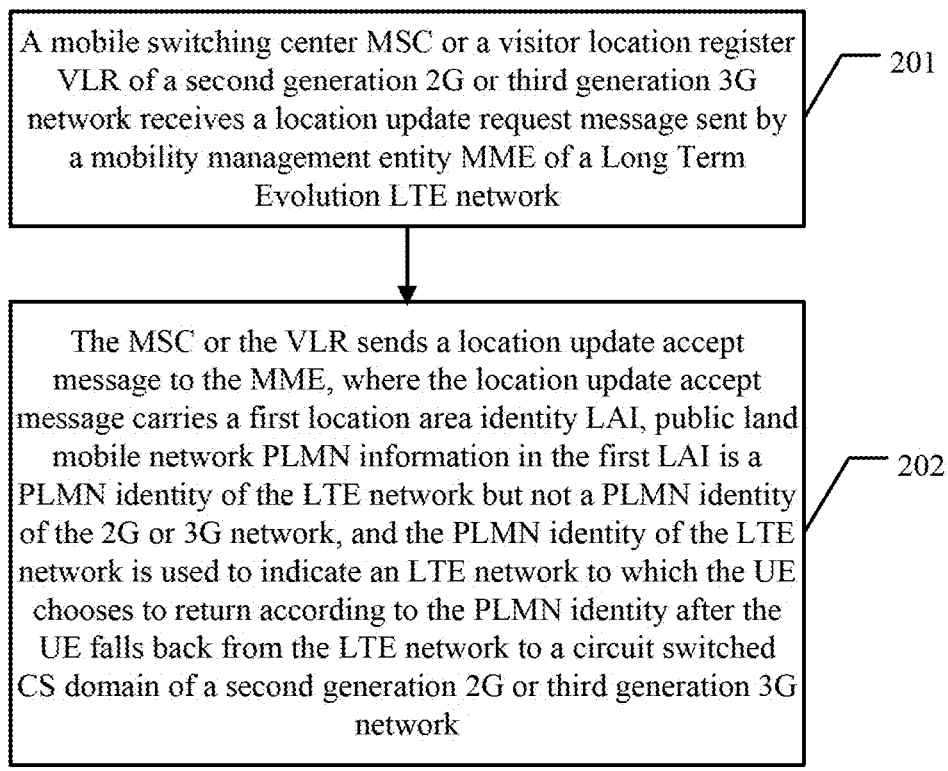
FIG. 5 is a schematic diagram of another embodiment of an LTE network selection method according to an embodiment of the present invention.

Referring to FIG. 5, another embodiment of an LTE network selection method provided in an embodiment of the present invention includes the following steps:

201. A mobile switching center MSC or a visitor location register VLR of a second generation 2G or third generation 3G network receives a location update request message sent by a mobility management entity MME of a Long Term Evolution LTE network.

202. The MSC or the VLR sends a location update accept message to the MME, where the location update accept message carries a first LAI, public land mobile network PLMN information in the first LAI is a PLMN identity of the LTE network but not a PLMN identity of the 2G or 3G network, and the PLMN identity of the LTE network is used to indicate an LTE network to which the UE chooses to return according to the PLMN identity after the UE falls back from the LTE network to a circuit switched CS domain of a second generation 2G or third generation 3G network.

For detailed descriptions of the foregoing processing steps and other processing steps of the mobile switching center MSC or visitor location register VLR in this embodiment, reference may be made to the descriptions in the embodiments corresponding to FIG. 1 to FIG. 3, and details are not described herein again.

Figure 6:
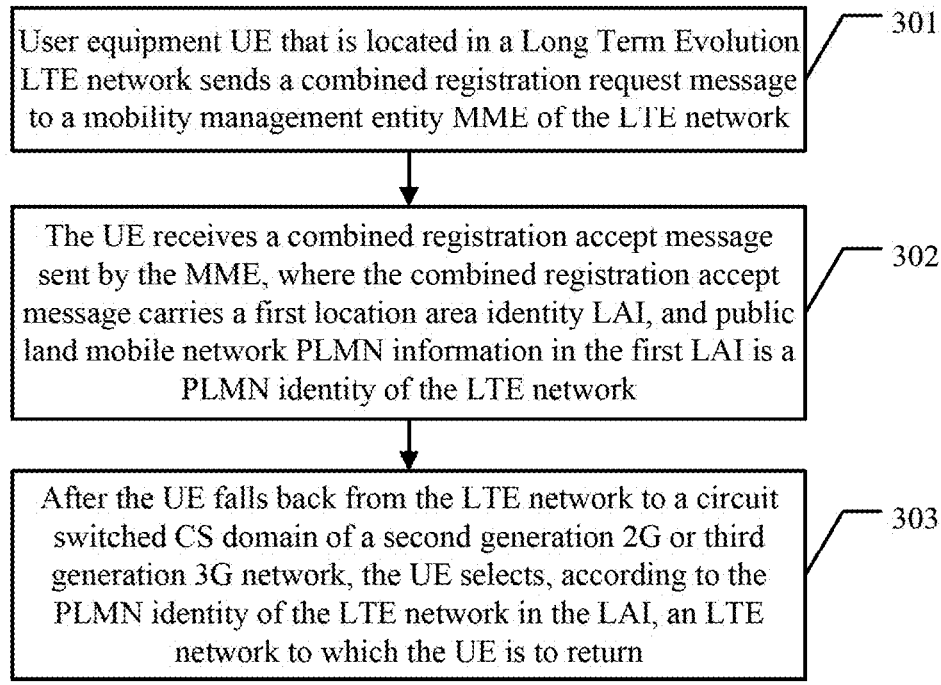
FIG. 6 is a schematic diagram of another embodiment of an LTE network selection method according to an embodiment of the present invention.

Referring to FIG. 6, another embodiment of an LTE network selection method provided in an embodiment of the present invention includes the following steps:

301. User equipment UE that is located in a Long-Term Evolution LTE network sends a combined registration request message to a mobility management entity MME of the LTE network.

302. The UE receives a combined registration accept message sent by the MME, where the combined registration accept message carries a first LAI, and public land mobile network PLMN information in the first LAI is a PLMN identity of the LTE network.

303. After the UE falls back from the LTE network to a circuit switched CS domain of a second generation 2G or third generation 3G network, the UE selects, according to the PLMN identity of the LTE network in the LAI, an LTE network to which the UE is to return.

The method in this embodiment may further include the following steps:

sending, by the UE, a request message to the MME, where the request message is used to request circuit switched fallback CSFB;

receiving, by the UE, a handover command sent by an evolved NodeB eNodeB, where the handover command is used to instruct to hand over the UE from the LTE network to the CS domain of the 2G or 3G network for the CSFB; and falling back, by the UE, from the LTE network to the CS domain of the 2G or 3G network according to the handover command.

The UE receives a redirect message sent by a base station of the 2G or 3G network, where the redirect message is used to instruct the UE to select the LTE network.

For detailed descriptions of the foregoing processing steps and other processing steps of the UE in this embodiment, reference may be made to the descriptions in the embodiments corresponding to FIG. 1 to FIG. 3, and details are not described herein again.

Figure 7:
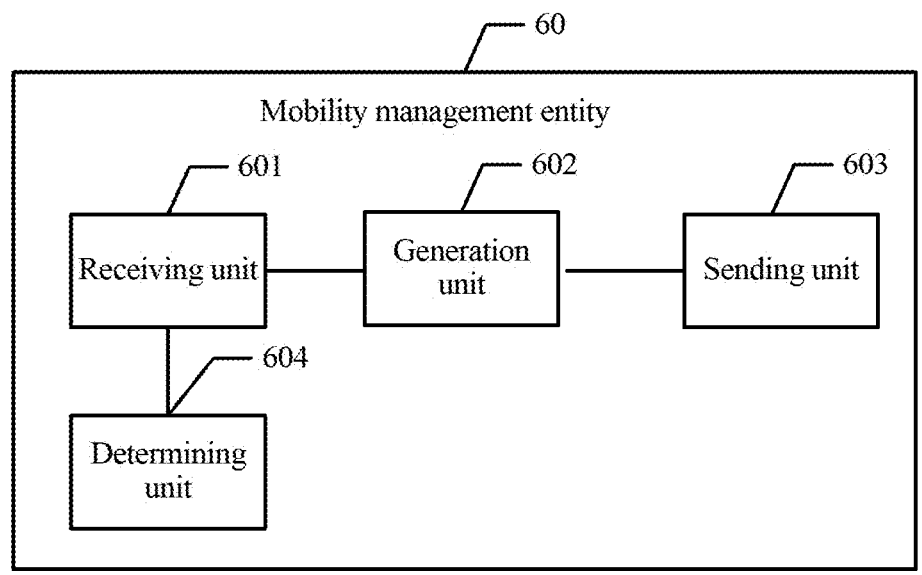
FIG. 7 is a schematic diagram of an embodiment of a mobility management entity according to an embodiment of the present invention.

Referring to FIG. 7, a mobility management entity MME 60 of a Long Term Evolution LTE network provided in an embodiment of the present invention includes a receiving unit 601, a generation unit 602, and a sending unit 603.

The receiving unit 601 is configured to receive a combined registration request message initiated by user equipment UE that is located in the LTE network.

The generation unit 602 is configured to generate a combined registration accept message according to the combined registration request message received by the receiving unit 601, where the combined registration accept message carries a first LAI, PLMN information in the first LAI is a PLMN identity of the LTE network, and the PLMN identity of the LTE network is used to indicate an LTE network to which the UE chooses to return according to the PLMN identity after the UE falls back from the LTE network to a circuit switched CS domain of a second generation 2G or third generation 3G network.

The sending unit 603 is configured to send, to the UE, the combined registration accept message generated by the generation unit 602.

The sending unit 603 is further configured to send a location update request message to a mobile switching center MSC or a visitor location register VLR of the 2G or 3G network after the receiving unit 601 receives the combined registration request message and before the sending unit sends the combined registration accept message to the UE.

The receiving unit 601 is further configured to receive a location update accept message sent by the MSC or the VLR, where the location update accept message carries a second LAI, and PLMN information in the second LAI is a PLMN identity of the 2G or 3G network.

The mobility management entity 60 may further include a determining unit 604.

The determining unit 604 is configured to determine that the UE supports handover from the LTE network to the CS domain of the 2G or 3G network.

The receiving unit 601 is further configured to receive a request message initiated by the UE that is located in the LTE network, where the request message is used to request circuit switched fallback CSFB.

The generation unit 602 is further configured to generate a notification message according to the request message received by the receiving unit 601, where the notification message is used to instruct an eNodeB to move the UE from the LTE network to the circuit switched CS domain of the 2G or 3G network for the CSFB.

The sending unit 603 is further configured to send, to the evolved NodeB eNodeB, the notification message generated by the generation unit 602.

The receiving unit 601 is further configured to receive a handover required message sent by the eNodeB.

The generation unit 602 is further configured to generate a first handover request message according to the handover required message received by the receiving unit 601, where the first handover request message is used to request the MSC or the VLR to hand over the UE from the LTE network to the CS domain of the 2G or 3G network for the CSFB.

The sending unit 603 is further configured to send, to the mobile switching center MSC or the VLR, the first handover request message generated by the generation unit 602.

The mobility management entity in this embodiment may execute method steps of the MME described in the method embodiments of FIG. 1, FIG. 2, FIG. 3, and FIG. 4, where the receiving unit 601 is configured to receive a message sent by another entity to the MME, and the sending unit 603 is configured to send a message to the another entity. A person skilled in the art may understand behaviors of the units of the MME, actions executed by the units, and relationships between the units according to the steps executed in these method embodiments.

Figure 8:
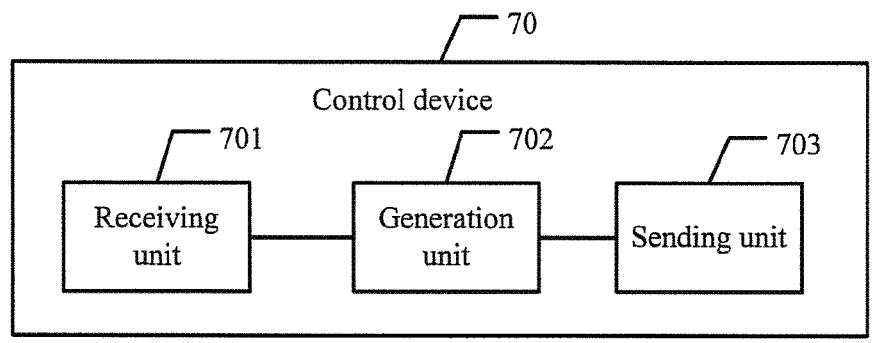
FIG. 8 is a schematic diagram of an embodiment of a control device according to an embodiment of the present invention.

Referring to FIG. 8, an embodiment of the present invention provides a control device 70, where the control device 70 may be a mobile switching center MSC or a visitor location register VLR, and the control device 70 includes a receiving unit 701, a generation unit 702, and a sending unit 703.

The receiving unit 701 is configured to receive a location update request message sent by a mobility management entity MME of a Long Term Evolution LTE network.

The generation unit 702 is configured to generate a location update accept message according to the location update request message received by the receiving unit 701, where the location update accept message carries a first LAI, public land mobile network PLMN information in the first LAI is a public land mobile network PLMN identity of the LTE network but not a PLMN identity of the 2G or 3G network, and the PLMN identity of the LTE network is used to indicate an LTE network to which the UE chooses to return according to the PLMN identity after the UE falls back from the LTE network to a circuit switched CS domain of a second generation 2G or third generation 3G network.

The sending unit 703 is configured to send, to the MME, the location update accept message generated by the generation unit 702.

The receiving unit 701 is further configured to receive a first handover request message sent by the MME, where the first handover request message is used to request the MSC to hand over the user equipment UE from the Long Term Evolution LTE network to the circuit switched CS domain of the second generation 2G or third generation 3G network for circuit switched fallback CSFB.

The generation unit 702 is further configured to generate a third handover request message according to the first handover request message received by the receiving unit 701, where the third handover request message is used to request a base station to allocate a CS domain resource for handover of the UE to the CS domain of the 2G or 3G network.

The sending unit 703 is further configured to send, to the base station of the 2G or 3G network, the third handover request message generated by the generation unit 702.

The receiving unit 701 is further configured to receive a third handover request response message sent by the base station, where the third handover request response message includes information about the CS domain wireless resource allocated by the base station for the handover of the US to the CS domain of the 2G or 3G network.

The sending unit 703 is further configured to send a first handover response message to the MME, where the first handover response message includes the information about the CS domain wireless resource.

The receiving unit 701 is further configured to receive a handover complete message sent by the UE, where the handover complete message indicates that the handover of the US from the LTE network to the CS domain of the 2G or 3G network is completed.

The control device in this embodiment may execute method steps of the MSC or the VLR described in the method embodiments of FIG. 1, FIG. 2, FIG. 3, and FIG. 5, where the receiving unit 701 is configured to receive a message sent by another entity to an evolved NodeB, and the sending unit 703 is configured to send a message to the another entity. A person skilled in the art may understand behaviors of the units of the MSC or the VLR, actions executed by the units, and relationships between the units according to the steps executed in these method embodiments.

Figure 9:
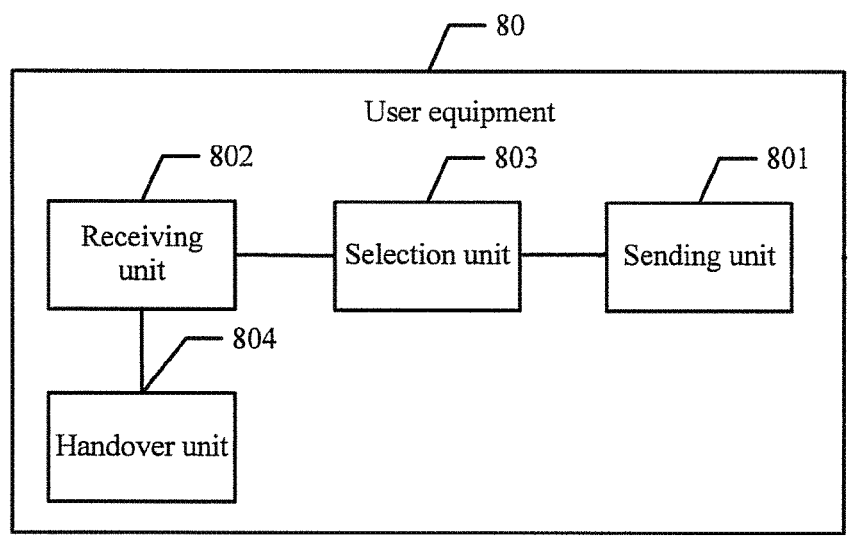
FIG. 9 is a schematic diagram of an embodiment of user equipment according to an embodiment of the present invention.

Referring to FIG. 9, user equipment UE 80 that is provided in an embodiment of the present invention and is located in a Long Term Evolution LTE network includes a sending unit 801, a receiving unit 802, and a selection unit 803.

The sending unit 801 is configured to send a combined registration request message to a mobility management entity MME of the LTE network.

The receiving unit 802 is configured to receive a combined registration accept message sent by the MME, where the combined registration accept message carries a first LAI, and public land mobile network PLMN information in the first LAI is a PLMN identity of the LTE network.

The selection unit 803 is configured to: after the UE falls back from the LTE network to a circuit switched CS domain of a second generation 2G or third generation 3G network, select, according to the PLMN identity of the LTE network in the LAI received by the receiving unit 802, an LTE network to which the UE is to return.

The sending unit 801 is further configured to send a request message to the MME, where the request message is used to request circuit switched fallback CSFB.

The receiving unit 802 is further configured to receive a handover command sent by an evolved NodeB eNodeB, where the handover command is used to instruct to hand over the UE from the LTE network to the CS domain of the 2G or 3G network for the CSFB.

The user equipment 80 further includes:

a handover unit 804, configured to fall back from the LTE network to the CS domain of the 2G or 3G network according to the handover command received by the receiving unit 802.

The receiving unit 802 is further configured to receive a redirect message sent by a base station of the 2G or 3G network, where the redirect message is used to instruct the UE to return to the LTE network.

The UE in this embodiment may execute method steps of the UE described in the method embodiments of FIG. 1, FIG. 2, FIG. 3, and FIG. 6, where the receiving unit 802 is configured to receive a message sent by another entity to the UE, and the sending unit 801 is configured to send a message to the another entity. A person skilled in the art may understand behaviors of the units of the UE, actions executed by the units, and relationships between the units according to the steps executed in these method embodiments.

By using the foregoing apparatus embodiments provided in the present invention, in a process of implementing CSFB combined registration, the MME sends a LAI to UE, where the LAI includes a PLMN identity of the LTE network, so that after a circuit switched fallback-based voice session ends, the UE preferably returns to the LTE network according to the PLMN identity of the LTE network.

A person skilled in the art can understand that, in the embodiments of FIG. 7 to FIG. 9, a sending unit configured to send a message may be implemented by a transmitter, and a receiving unit configured to receive a message may be implemented by a receiver, or both a sending unit and a receiving unit may be implemented by a transceiver. In physical implementation, the transmitter or the transceiver may be implemented by one physical entity or by multiple physical entities, and the transmitter and the transceiver may be implemented by one physical entity or by multiple physical entities, which is not limited in the present invention. Other units, such as a generation unit, a handover unit, a processing unit, and a determining unit may be implemented by one or more processors, which is not limited in the present invention.

Figure 10:
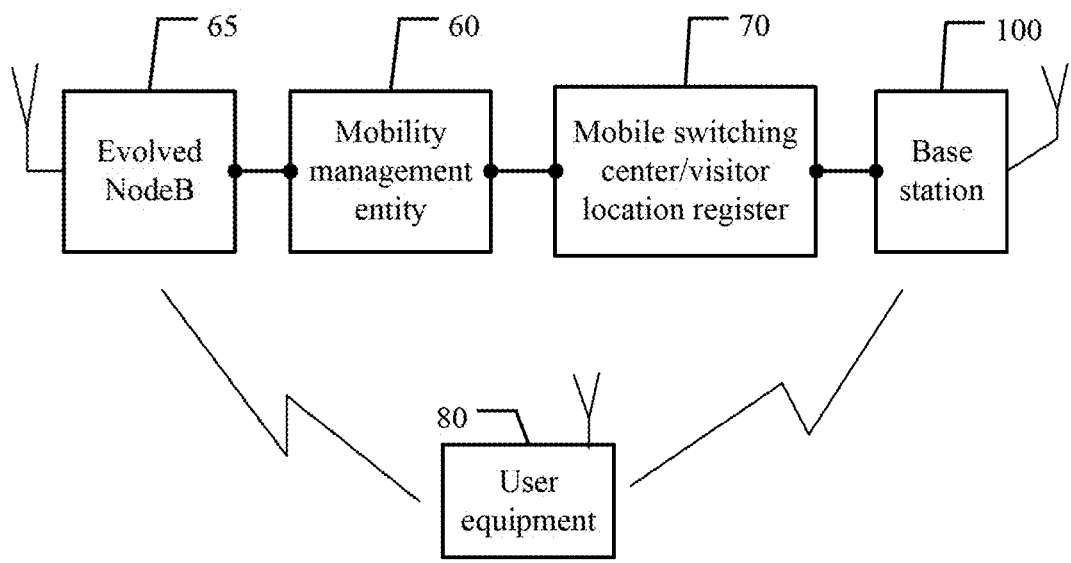
FIG. 10 is a schematic diagram of an embodiment of a system according to an embodiment of the present invention.

Referring to FIG. 10, an embodiment of a network handover system provided in an embodiment of the present invention includes a mobility management entity 60, an evolved NodeB 65, a visitor location register or a mobile switching center 70, a base station 100, and user equipment 80.

For actions respectively executed by the mobility management entity 60, the evolved NodeB 65, the visitor location register or the mobile switching center 70, the base station 100, and the user equipment 80, and interactions among them, reference may be made to the descriptions in FIG. 1 to FIG. 3 and descriptions of the method embodiments and the apparatus embodiments in FIG. 4 to FIG. 9, and details are not described herein again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the Present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The LTE network mentioned in the present invention includes an LTE A network and subsequent possible LTE versions.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An LTE network selection method, comprising:
receiving, by a mobility management entity (MME) of a Long Term Evolution (LTE) network, a combined registration request message initiated by a user equipment (UE) that is located in the LTE network; and
sending, by the MME, a combined registration accept message to the UE, wherein the combined registration accept message carries a first location area identity (LAI), public land mobile network (PLMN) information in the first LAI comprises a PLMN identity of the LTE network for enabling the UE to select the LTE network to return to according to the PLMN identity after the UE falls back from the LTE network to a circuit switched (CS) domain of a second generation (2G) or third generation (3G) network.

2. The method according to claim 1, wherein after receiving, by an MME of an LTE network, a combined registration request message initiated by UE that is located in the LTE network, and before sending, by the MME, a combined registration accept message to the UE, the method further comprises:
sending, by the MME, a location update request message to a mobile switching center (MSC) or a visitor location register (VLR) of the 2G or 3G network; and
receiving, by the MME, a location update accept message sent by the MSC or the VLR, wherein the location update accept message carries a second LAI, and PLMN information in the second LAI comprises a PLMN identity of the 2G or 3G network.

3. The method according to claim 2, further comprising:
receiving, by the MME, a request message initiated by the UE that is located in the LTE network, wherein the request message is configured to request circuit switched fallback (CSFB);
sending, by the MME, a notification message to an evolved NodeB (eNodeB) according to the request message, wherein the notification message is configured to instruct the eNodeB to move the UE from the LTE network to the CS domain of the 2G or 3G network for the CSFB;
receiving, by the MME, a handover required message sent by the eNodeB; and
sending, by the MME, a first handover request message to the MSC or the VLR, wherein the first handover request message is configured to request the MSC or the VLR to hand over the UE from the LTE network to the CS domain of the 2G or 3G network for the CSFB.

4. An LTE network selection method, comprising:
receiving, by a control device, a location update request message sent by a mobility management entity (MME) of a Long Term Evolution (LTE) network, wherein the control device is a mobile switching center (MSC) or a visitor location register (VLR) of a second generation (2G) or third generation (3G) network; and
sending, by the control device, a location update accept message to the MME, wherein the location update accept message carries a first location area identity (LAI), public land mobile network (PLMN) information in the first LAI comprises a PLMN identity of the LTE network but not a PLMN identity of the 2G or 3G network, the PLMN identity of the LTE network for enabling a user equipment (UE) to select the LTE network to return to according to the PLMN identity after the UE falls back from the LTE network to a circuit switched (CS) domain of a 2G or 3G network.

5. The method according to claim 4, further comprising:
receiving, by the control device, a first handover request message sent by the MME, wherein the first handover request message is configured to request the control device to hand over the UE from the LTE network to the CS domain of the 2G or 3G network for circuit switched fallback (CSFB);
sending, by the control device, a third handover request message to a base station of the 2G or 3G network, wherein the third handover request message is configured to request the base station to allocate a CS domain resource for handover of the UE to the CS domain of the 2G or 3G network; and
receiving, by the control device, a third handover request response message sent by the base station, wherein the third handover request response message comprises information about the CS domain resource allocated by the base station for the handover of the UE to the CS domain of the 2G or 3G network.

6. An LTE network selection method, comprising:
sending, by a user equipment (UE) located in a Long Term Evolution (LTE) network, a combined registration request message to a mobility management entity (MME) of the LTE network;
receiving, by the UE, a combined registration accept message sent by the MME, wherein the combined registration accept message carries a first location area identity (LAI), and public land mobile network (PLMN) information in the first LAI comprises a PLMN identity of the LTE network; and
after the UE falls back from the LTE network to a circuit switched (CS) domain of a second generation (2G) or third generation (3G) network, selecting, by the UE according to the PLMN identity of the LTE network in the LAI, the LTE network to which the UE is to return.

7. The method according to claim 6, further comprising:
sending, by the UE, a request message to the MME, wherein the request message is configured to request circuit switched fallback (CSFB);
receiving, by the UE, a handover command sent by an evolved NodeB (eNodeB), wherein the handover command is configured to instruct to hand over the UE from the LTE network to the CS domain of the 2G or 3G network for the CSFB; and
falling back, by the UE, from the LTE network to the CS domain of the 2G or 3G network according to the handover command.

8. The method according to claim 6, wherein the combined registration request message is a combined attach request message or a combined tracking area update request message.

9. The method according to claim 6, wherein the combined registration accept message further carries a tracking area identity (TAI), and PLMN information in the TAI is the PLMN identity of the LTE network.

10. A mobility management entity (MME) of a Long Term Evolution (LTE) network, the MME comprising:
   computing hardware; and
   a non-transitory computer-readable storage medium including computer-executable instructions that, when executed by the computing hardware, cause the MME to:
      receive a combined registration request message initiated by a user equipment (UE) that is located in the LTE network, and
      send a combined registration accept message to the UE, wherein the combined registration accept message carries a first location area identity (LAI), public land mobile network (PLMN) information in the first LAI comprises a PLMN identity of the LTE network for enabling the UE to select the LTE network to return to according to the PLMN identity after the UE falls back from the LTE network to a circuit switched (CS) domain of a second generation (2G) or third generation (3G) network.

11. The mobility management entity according to claim 10, wherein the computer-executable instructions, when executed by the computing hardware, further cause the MME to:
   after receipt, by the MME, of the combined registration request message initiated by UE, and before the combined registration accept message is sent to the UE, send a location update request message to a mobile switching center (MSC) or a visitor location register (VLR) of the 2G or 3G network, and receive a location update accept message sent by the MSC or the VLR, wherein the location update accept message carries a second LAI, and PLMN information in the second LAI comprises a PLMN identity of the 2G or 3G network.

12. The mobility management entity according to claim 11, wherein the computer-executable instructions, when executed by the computing hardware, further cause the MME to:
   receive a request message initiated by the UE located in the LTE network, wherein the request message is configured to request circuit switched fallback (CSFB);
   send a notification message to an evolved NodeB (eNodeB) according to the request message, wherein the notification message is configured to instruct the eNodeB to move the UE from the LTE network to the CS domain of the 2G or 3G network for the CSFB;
   receive a handover required message sent by the eNodeB; and
   send a first handover request message to the MSC or the VLR, wherein the first handover request message is configured to request the MSC or the VLR to hand over the UE from the LTE network to the CS domain of the 2G or 3G network for the CSFB.

13. A control device of a second generation (2G) or third generation (3G) network, wherein the control device is a mobile switching center (MSC) or a visitor location register (VLR), the control device comprising:
   computing hardware; and
   a non-transitory computer-readable storage medium including computer-executable instructions that, when executed by the computing hardware, cause the control device to:
      receive a location update request message sent by a mobility management entity (MME) of a Long Term Evolution (LTE) network, and
      send a location update accept message to the MME, wherein the location update accept message carries a first location area identity (LAI), public land mobile network (PLMN) information in the first LAI comprises a PLMN identity of the LTE network but not a PLMN identity of the 2G or 3G network, the PLMN identity of the LTE network for enabling a user equipment (UE) to select the LTE network to return to according to the PLMN identity after the UE falls back from the LTE network to a circuit switched (CS) domain of a 2G or 3G network.

14. The control device according to claim 13, wherein the computer-executable instructions, when executed by the computing hardware, further cause the control device to:
   receive a first handover request message sent by the MME, wherein the first handover request message is configured to request the control device to hand over the UE from the LTE network to the CS domain of the 2G or 3G network for circuit switched fallback (CSFB);
   send a third handover request message to a base station of the 2G or 3G network, wherein the third handover request message is configured to request the base station to allocate a CS domain resource for handover of the UE to the CS domain of the 2G or 3G network; and
   receive a third handover request response message sent by the base station, wherein the third handover request response message comprises information about the CS domain resource allocated by the base station for the handover of the UE to the CS domain of the 2G or 3G network.

15. The control device according to claim 14, wherein the computer-executable instructions, when executed by the computing hardware, further cause the control device to:
   send a first handover response message to the MME, wherein the first handover response message comprises the information about the CS domain resource; and
   receive a handover complete message sent by the UE, wherein the handover complete message indicates that the handover of the UE from the LTE network to the CS domain of the 2G or 3G network is completed.

16. User equipment (UE) that is located in a Long Term Evolution (LTE) network, the UE comprising:
   a processor configured to cause the UE to:
      send a combined registration request message to a mobility management entity (MME) of the LTE network;
      receive a combined registration accept message sent by the MME, wherein the combined registration accept message carries a first location area identity (LAI), and public land mobile network (PLMN) information in the LAI comprises a PLMN identity of the LTE network; and
      after the UE falls back from the LTE network to a circuit switched (CS) domain of a second generation (2G) or third generation (3G) network, select, according to the PLMN identity of the LTE network in the LAI received by the UE, the LTE network to which the UE is to return.

17. The user equipment according to claim 16, wherein the processor is further configured to cause the UE to:
- send a request message to the MME, wherein the request message is configured to request circuit switched fallback (CSFB);
- receive a handover command sent by an evolved NodeB (eNodeB), wherein the handover command is configured to instruct to hand over the UE from the LTE network to the CS domain of the 2G or 3G network for the CSFB; and
- fall back from the LTE network to the CS domain of the 2G or 3G network according to the handover command received by the UE.

18. The user equipment according to claim 16, wherein the processor is further configured to cause the UE to:
- receive a redirect message sent by a base station of the 2G or 3G network, wherein the redirect message is configured to instruct the UE to return to the LTE network.

* * * * *